US007728542B2

(12) United States Patent
Bruno et al.

(10) Patent No.: US 7,728,542 B2
(45) Date of Patent: Jun. 1, 2010

(54) CONTROL METHOD AND AWNING INSTALLATION CONTROLLED BY THIS METHOD

(75) Inventors: Serge Bruno, Marnaz (FR); Pierre-Emmanuel Cavarec, Magland (FR)

(73) Assignee: Somfy SAS, Cluses (FR)

( * ) Notice: Subject to any disclaimer, the term of this patent is extended or adjusted under 35 U.S.C. 154(b) by 241 days.

(21) Appl. No.: 11/785,070

(22) Filed: Apr. 13, 2007

(65) Prior Publication Data

US 2007/0247100 A1 Oct. 25, 2007

(30) Foreign Application Priority Data

Apr. 14, 2006 (FR) .................................. 06 03351

(51) Int. Cl.
*G05D 23/00* (2006.01)

(52) U.S. Cl. ........................ 318/469; 318/468; 318/466

(58) Field of Classification Search ................ 318/469; 160/70
See application file for complete search history.

(56) References Cited

U.S. PATENT DOCUMENTS

| | | | | | |
|---|---|---|---|---|---|
| 1,552,687 | A | * | 9/1925 | Fenster | 318/468 |
| 3,675,751 | A | * | 7/1972 | Fortner | 192/150 |
| 4,514,670 | A | * | 4/1985 | Fassel et al. | 318/467 |
| 4,733,683 | A | * | 3/1988 | Pozzi | 160/22 |
| 4,997,021 | A | * | 3/1991 | Brutsaert | 160/22 |
| 5,038,087 | A | * | 8/1991 | Archer et al. | 318/469 |
| 5,148,848 | A | * | 9/1992 | Murray et al. | 160/67 |
| 5,207,255 | A | * | 5/1993 | Shannon | 160/65 |
| 5,232,036 | A | * | 8/1993 | Brutsaert | 160/70 |
| 5,307,856 | A | * | 5/1994 | Murray | 160/70 |
| 5,832,978 | A | * | 11/1998 | Kroner | 160/79 |
| 5,850,131 | A | * | 12/1998 | Wolfer et al. | 318/466 |
| 5,921,305 | A | * | 7/1999 | Grudl | 160/66 |
| 6,021,836 | A | * | 2/2000 | Schmitz | 160/70 |
| 6,107,765 | A | * | 8/2000 | Fitzgibbon et al. | 318/266 |
| 6,114,820 | A | * | 9/2000 | Nishigaya | 318/466 |
| 6,225,769 | B1 | * | 5/2001 | Brenner et al. | 318/434 |
| 6,236,176 | B1 | * | 5/2001 | Uebelein et al. | 318/287 |
| 6,276,424 | B1 | * | 8/2001 | Frey, Jr. | 160/67 |
| 6,469,464 | B1 | * | 10/2002 | McCall | 318/445 |
| 6,557,612 | B2 | * | 5/2003 | Voss | 160/79 |
| 6,566,828 | B2 | * | 5/2003 | Fitzgibbon et al. | 318/283 |
| 6,675,862 | B2 | * | 1/2004 | Kobayashi et al. | 160/370.22 |
| 6,732,018 | B2 | * | 5/2004 | Osinga | 700/275 |
| 6,782,936 | B1 | * | 8/2004 | Girard et al. | 160/66 |
| 6,957,679 | B2 | * | 10/2005 | Powell et al. | 160/64 |
| 7,152,652 | B2 | * | 12/2006 | Heitel | 160/5 |
| 7,242,162 | B2 | * | 7/2007 | Goth | 318/480 |
| 7,330,007 | B2 | * | 2/2008 | Sugiura et al. | 318/456 |

(Continued)

FOREIGN PATENT DOCUMENTS

| | | |
|---|---|---|
| DE | 94 21 948 | 2/1998 |

(Continued)

*Primary Examiner*—Jeffrey Donels
*Assistant Examiner*—Forrest M Phillips
(74) *Attorney, Agent, or Firm*—Dowell & Dowell P.C.

(57) ABSTRACT

This method for controlling a motorized awning installation comprises:

during the deployment of a cloth, a step of supervising the tension of the cloth, and a step of rolling up the cloth on a tube initiated automatically in response to a drop in the supervised tension, and stopped automatically before a perceptible folding of the arms for guidance of the cloth.

13 Claims, 5 Drawing Sheets

U.S. PATENT DOCUMENTS

| | | | | |
|---|---|---|---|---|
| 2001/0027846 | A1* | 10/2001 | Osinga | 160/70 |
| 2002/0069976 | A1* | 6/2002 | Woss | 160/70 |
| 2002/0089209 | A1* | 7/2002 | Kobayashi et al. | 296/97.4 |
| 2004/0159407 | A1* | 8/2004 | Girard et al. | 160/66 |
| 2004/0188034 | A1* | 9/2004 | Powell et al. | 160/70 |
| 2005/0035280 | A1* | 2/2005 | Smith et al. | 250/231.14 |
| 2005/0039861 | A1* | 2/2005 | Faludy et al. | 160/66 |
| 2006/0060307 | A1* | 3/2006 | Heitel | 160/66 |
| 2007/0193700 | A1* | 8/2007 | Ornelas et al. | 160/70 |
| 2007/0240832 | A1* | 10/2007 | Cavarec | 160/70 |
| 2007/0247100 | A1* | 10/2007 | Bruno et al. | 318/466 |
| 2008/0053624 | A1* | 3/2008 | Ito | 160/75 |
| 2008/0128095 | A1* | 6/2008 | Van Zutven | 160/22 |

FOREIGN PATENT DOCUMENTS

| | | |
|---|---|---|
| FR | 2 816 465 | 5/2002 |

* cited by examiner

Fig. 2a
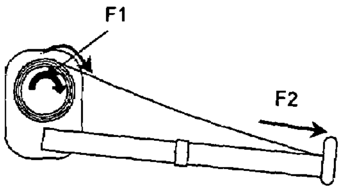
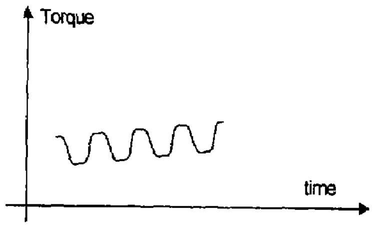
Fig. 3a
Fig. 2b
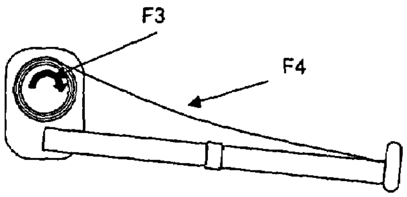
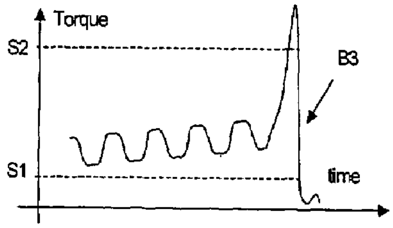
Fig. 3b
Fig. 2c
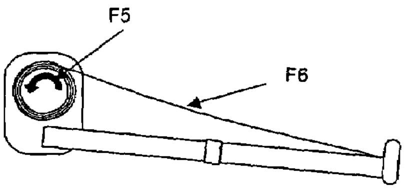
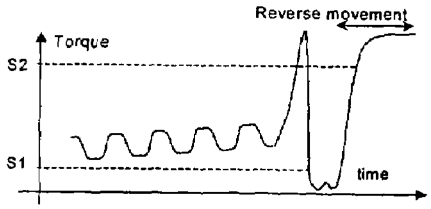
Fig. 3c

CONTROL METHOD AND AWNING INSTALLATION CONTROLLED BY THIS METHOD

BACKGROUND OF THE INVENTION

1. Field of the Invention

The present invention relates to the field of motorized solar protection elements and in particular of awnings with arms, such as for example terrace awnings.

2. Brief Description of the Related Art

Existing installations of motorized awnings include an awning cloth and arms that can unfold for guidance of the cloth whose movement accompanies a movement for deployment or retraction of the cloth, the cloth being capable of being rolled around a tube set in motion by an actuator.

More precisely, an awning installation with arms usually comprises the following elements: a rolling tube, held at its ends in a case or by supports, foldable arms, an awning cloth and a rigid bar called a load bar. A tubular actuator makes it possible to motorize the installation.

The awning cloth is attached by one of its sides to the rolling tube inside which the tubular, actuator is located. This actuator rotates the tube and consequently makes it possible to roll up or unroll the cloth. The cloth is also attached on its opposite side to said load bar. The latter makes it possible to hold the cloth and, where necessary, is used to close the awning case when the cloth is in its retracted position.

The awning arms are attached on the one hand to the awning case (or to appropriate supports) and on the other hand to the load bar. They have at least one articulated elbow allowing them to fold or unfold. The arms are furnished, usually at the elbow, with springs that are tensed when the cloth is retracted.

Awnings with arms are usually deployed substantially horizontally. Thus, the cloth cannot be deployed only under the effect of the weight of the load bar. For deployment, the arms have a tendency, under the effect of the springs, to try to unfold. Accordingly, if the actuator releases the rotation of the rolling tube, the cloth is operated by the arms and the awning deploys.

When the awning is retracted, the actuator rotates the rolling tube which has the effect of pulling on the arms via the cloth to fold them.

The springs of the arms usually have a strong stiffness factor. Specifically, it is required that the awnings conventionally sold on the market are unrolled with the cloth under great tension, irrespective of the stopping position, for esthetic and technical reasons (no water pocket in the event of rain, more rigid holding and hence resistance to the wind, etc.).

These cloth tension stresses cause over time a distention and lengthening of the latter which may lead to carrying out readjustments.

The fully deployed position, also known as the "bottom end-of-travel position" is identified without abutment, usually thanks to a metering device. In the existing installations, this position also corresponds to a locking position in which the arms are unfolded beyond a position in which the segments of the arms are aligned. More precisely, in existing installations, each arm comprises at least two segments articulated relative to one another about an axis of rotation perpendicular to the plane of movement. An angle $\alpha$ is defined by the two segments in the plane of movement. This angle $\alpha$ increases as the cloth is deployed. The locking position corresponds to a position in which the angle $\alpha$ is greater than 180°. In this position, it is said that the arms are "braced".

This locking position allows a good retention of the tension of the cloth, particularly relative to the wind.

On the other hand, the passing of this locking position, during the deployment or more particularly the retraction of the cloth, requires the actuator to be capable of developing a high operating torque.

Accordingly, the actuators designed for awnings with arms are dimensioned for a high torque that is globally necessary only for unlocking the arms, that is to say the transition from the locking position. The rest of the travel requires only a medium torque.

In addition, the whole awning must satisfy criteria of precision, sensitivity and sealing.

Because of these criteria, the motorization of the awnings is costly since the actuators must be powerful (from 25 to 120 Nm) and the metering devices elaborate.

SUMMARY OF THE INVENTION

The invention therefore seeks to work around these requirements and proposes to simplify the control of the awning installation, while retaining a cloth tension suitable for market demand.

Its subject is therefore a method for controlling an awning installation comprising:

- during deployment of the cloth, a step of supervising a magnitude representative of the tension of the cloth,
- a step of rolling the cloth on the tube initiated automatically in response to a drop in the tension of the cloth following a stoppage of the associated movement of the arms during deployment, this rolling step being stopped automatically before a perceptible folding of the arms.

Initiating the step of rolling the cloth as soon as the tension of the cloth drops in particular makes it possible to automatically re-tension this cloth. In addition, using a magnitude representative of the tension of the cloth simplifies the control method since it is no longer necessary to use metering devices for controlling the stoppage of deployment of the cloth. In fact a simple abutment capable of stopping the unfolding of the arms is sufficient to cause a drop in the tension of the cloth and hence to stop its deployment.

Finally, detecting a drop in the tension of the cloth from the magnitude representative of this tension makes it possible not only to re-tension the cloth when the arms have reached abutment, but also to re-tension the cloth when the arms have encountered an obstacle external to the awning installation.

"A perceptible folding of the arms" is here defined as a folding movement of the arms corresponding to a movement of the cloth that is less than 5% of the total travel of this cloth between a fully retracted position and a fully deployed position.

The embodiments of this method may comprise one or more of the following features:

- the supervision step comprises a measurement of the torque exerted by the actuator on the rolling tube;
- the rolling step is automatically stopped as soon as the magnitude representative of the tension of the cloth becomes greater than a predetermined threshold or as soon as the change in the representative magnitude exceeds a predetermined threshold;
- the rolling step is automatically stopped as soon as a predetermined time has elapsed since the initiation of the rolling step;
- the time or the threshold is predetermined during a learning phase so as not to cause a perceptible folding of the arms.

These embodiments of the method also have the following advantages:

using a measurement of the torque of the actuator as a magnitude representative of the tension of the cloth makes it possible to house the sensor in the rolling tube or even in the actuator and therefore to protect it, stopping the rolling step according to a predetermined tension threshold makes it possible to guarantee that the cloth has been re-tensioned, stopping the rolling step after a predetermined time makes it possible to re-tension the cloth without, for all that, again measuring the tension of this cloth, and determining the predetermined time or the predetermined threshold so as not to cause the perceptible folding of the arms makes it possible to maintain a maximum deployment of this cloth.

A further subject of the invention is a motorized awning installation comprising:

an awning cloth, a controllable actuator capable of causing the awning cloth to be rolled on a rolling tube, several folding arms capable of accompanying the movement of the awning cloth, a sensor capable of measuring a magnitude representative of the tension of the cloth during its deployment, and a computer capable of controlling the actuator, and capable of implementing the control method above.

The embodiments of this installation may include one or more of the following features:

each arm comprises at least two segments capable of pivoting relative to one another in a plane of movement of the arms, an angle α defined by the two segments in the plane of movement increasing as the cloth is deployed, the installation comprising an abutment mechanism capable of causing a stoppage of the arms during their unfolding when the value of the angle α reaches a given value called the stopping angle, less than 180° and preferably less than 150°;

the installation comprises a retention mechanism allowing the angle α to be maintained in a range ±X° about the stopping angle so long as a tension force exerted on the arms to reduce this angle remains below a predefined tension threshold, X being small relative to the value of the stopping angle, and preferably less than 5°;

the abutment and/or retention mechanism can be adjusted so as to regulate the value of the stopping angle, the predefined tension threshold or the value of X.

These embodiments of the installation also have the following advantages:

maintaining the angle α below 180° makes it possible to use a less powerful actuator to roll the cloth, which simplifies the design of the awning installation, and using a retention mechanism to maintain an angle α if a force, less than a predefined threshold, is applied to reduce this angle, makes it possible to lock the cloth close to its fully deployed position without using electrical energy.

BRIEF DESCRIPTION OF THE DRAWINGS

The invention will be better understood on reading the following description, given only as a nonlimiting example and made with reference to the drawings in which:

FIGS. 2*a*, 2*b* and 2*c* represent schematically the installation of FIG. 1 in three different positions, FIGS. 3*a*, 3*b* and 3*c* are time-series charts representing, as a function of time, the evolution of the torque of an actuator of FIG. 1.

DESCRIPTION OF THE PREFERRED EMBODIMENTS

Figure 1A:
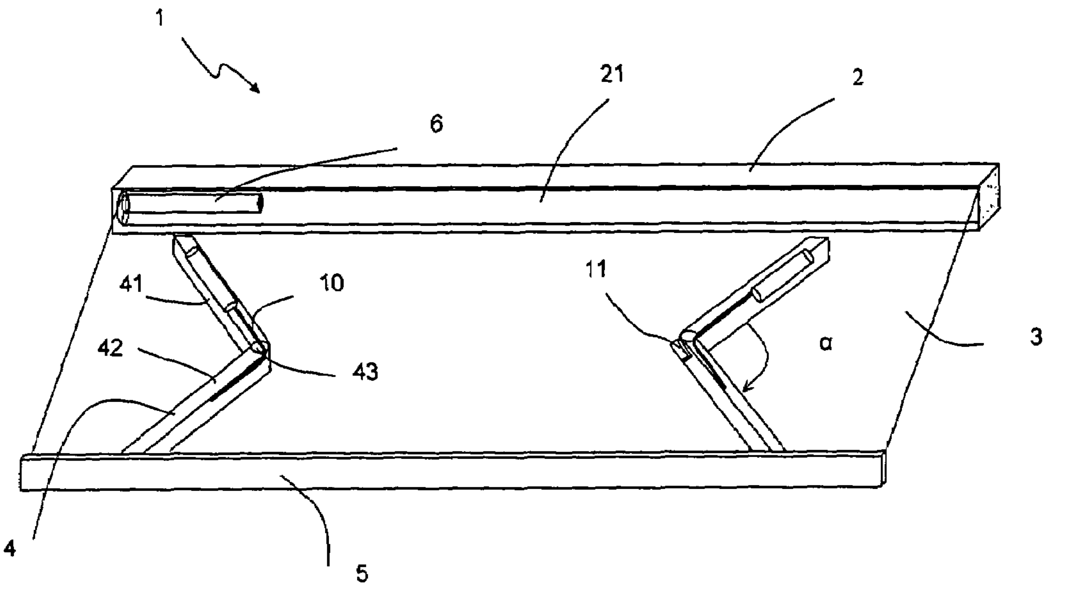
FIGS. 1*a* and 1*b* are schematic illustration in perspective of an awning installation.
Figure 1B:
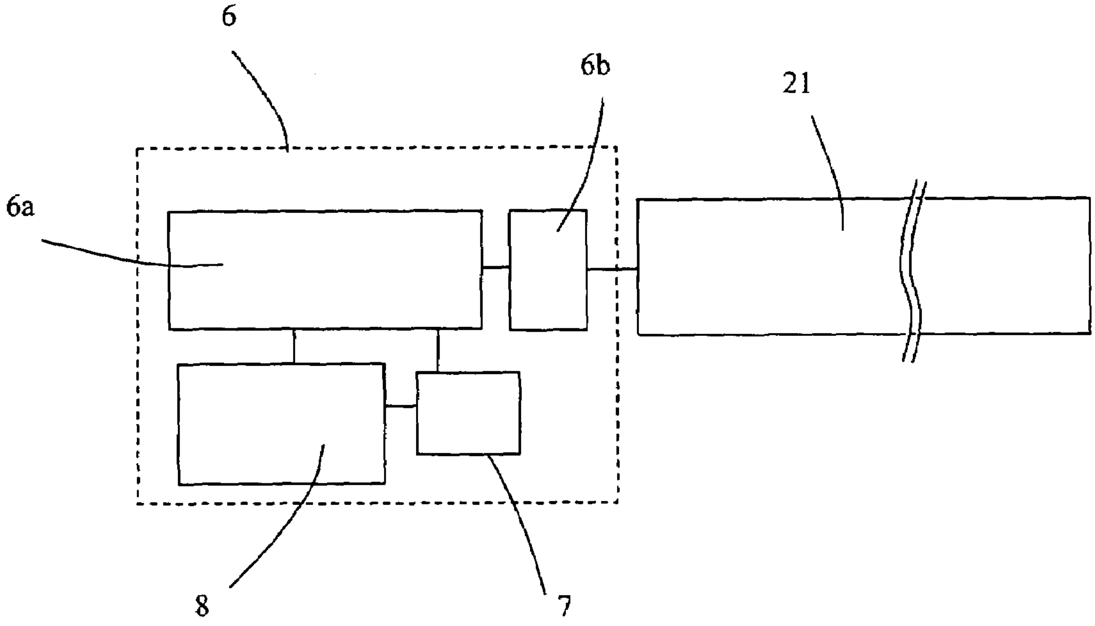

FIG. 1 presents an installation 1 of an awning with arms according to the invention.

Inside a case 2 attached to a structure, for example a building facade, there is a rolling tube 21 on which an awning cloth 3 rolls. The installation also comprises two foldable arms 4, attached on one side directly to the case 2 and on the other side to a load bar 5 holding the cloth 3 tensioned widthwise.

The arms 4 fold and unfold in a common plane of movement. For example, here, the plane of movement is substantially parallel to the plane of the cloth 3. Each arm is formed of two segments 41 and 42. One end of the segment 41 is connected to another end of the segment 42 by means of a hinge 43 forming an articulated elbow. The hinge 43 allows a pivoting of the segments 41 and 42 relative to one another about an axis of rotation perpendicular to the plane of movement. The angle defined between the segments 41 and 42 in the plane of movement is here marked α.

Each arm is fitted with an elastic device 10 capable of forcing the arm toward an unfolded position. Usually, the device 10 is presented in the form of springs tensioned during the folding of the arms 4.

Each arm also comprises an adjustable abutment mechanism 11. This mechanism 11 makes it possible to impose a maximum value $\alpha_{max}$ for the angle α. The value $\alpha_{max}$ is always strictly less than 180° and preferably less than 150°. Exemplary embodiments of the mechanism 11 are described with reference to FIGS. 6*a* and 6*b*. The actuation device will now be described with reference to FIG. 1*b*.

In the rolling tube there is a tubular actuator 6 furnished with an output shaft in the form of a wheel rotating the tube 21 in a first direction and, alternately in a second, opposite direction. For example, the output shaft is attached to the shaft of the tube 21 with no degree of freedom. The actuator 6 comprises a drive or reduction gear portion 6*a* and a brake 6*b*. The brake makes it possible to control the speed of rotation and also to keep the rolling tube locked.

During the deployment of the cloth, the actuator 6 at least partially releases the brake 6*b* and hence the rotation of the rolling tube in the first direction, under the action of the elastic device 10. The load bar 5 and the cloth 3 are then operated toward the fully deployed position.

The actuator also comprises a sensor 7 of the cloth motor torque. This sensor 7 makes it possible to measure a magnitude representative of the tension of the cloth 3. Alternately, it is the changes in this representative magnitude that make it possible to initiate the actions of deployment or retraction.

A sensor and a method for measuring the torque exerted by the actuator on the tube 21 are, for example, described in patent EP 1 269 596 (Somfy). This patent describes a device for stopping the motor when the load on the motor exceeds a determined value. It comprises means for converting the change in tension at the terminals of a phase difference capacitor, corresponding to a change in determined torque, into a chosen change in the tension irrespective of the maximum torque developed, means for comparing the converted tension with a reference tension and means for stopping the motor when the converted tension is less than the reference tension.

Typically, this sensor makes it possible to measure a motor or resisting torque. The torque is called resisting when the torque exerted by the actuator 6 is used to slow the deployment of the cloth. Conversely, the torque is called motor torque when the actuator 6 is controlled to roll the cloth 3.

Any type of sensor making it possible to measure a magnitude representative of the tension of the cloth can be envisaged, the latter not necessarily forming part of the actuator. Therefore, a sensor directly measuring the tension of the cloth or a sensor measuring associated movements of the tube for example enter into the context of the invention.

Finally, the actuator comprises an electronic computer 8 capable of executing one of the methods described with reference to FIGS. 4 and 5. This computer 8 is typically a programmable computer associated with a data storage medium containing instructions for the execution of one of these methods.

During the rolling of the cloth, the actuator 6 rotates the tube 21 in the second direction, which has the effect of pulling on the cloth 3 and of forcing the arms 4 to fold.

FIGS. 2*a* to 2*c* show the various steps of the method for controlling the deployment of the cloth 3. FIGS. 3*a* to 3*c* illustrate the change in the torque measured by the sensor 7, as a function of time, at the moments corresponding respectively to the steps of FIGS. 2*a* to 2*c*.

During the deployment of the cloth 3, seen in FIG. 2*a*, the rolling tube rotates in the first direction, the arms 4 unfold and the awning cloth unrolls. This is called the opening of the awning.

During this phase, the sensor 7 measures the cloth motor torque, for example at the output shaft of the actuator. As illustrated, the measured torque is not necessarily constant as a function of time during this step, due to a particular kinematic linked both to the springs of the arms and to the control of the actuator, which makes it possible to tension the cloth during the movement. However, globally it follows a linear law.

In FIG. 2*b*, the cloth has reached the fully deployed position, that is to say that the arms 4 can unfold no further. Here, it is the mechanism 11 that prevents the arms from unfolding more as will be detailed in FIGS. 6*a* and 6*b*.

When the cloth reaches its fully deployed position, for a brief moment, the arms pull strongly on the cloth before the actuator 6 continues unrolling. The cloth 3 then continues to unroll slightly and the measured torque (torque corresponding to the tension of the cloth) drops sharply because the tensioned cloth is no longer exerting any stress on the rolling tube and therefore on the actuator. Typically the measured torque falls below a threshold $S_1$. The computer 8 detects the sharp change in the measured torque and then commands the stoppage of rotation and hence the locking of the tube.

The installation is then stopped but the cloth is slack. It therefore does not have the esthetic or technical features desired by the users.

FIG. 3*b* illustrates the changes in the measured torque. The sharp drop B3 in torque is detected without confusion by the computer 8.

The computer 8 then automatically initiates a slight rotation of the tube 21 in the second direction, as shown in FIG. 2*c*. This rotation has the effect of tensioning the cloth, but it is stopped before the arms 4 begin to fold.

Stopping the rolling may be a function of the measured torque and/or of a predetermined time.

During the rolling, the measured torque increases again as can be seen in FIG. 3*c*. Therefore, in this particular embodiment, the computer 8 stops the rolling of the cloth 3 as soon as the measured torque exceeds a predetermined threshold $S_2$. The value of the threshold $S_2$ is adjusted to cause the rolling of the cloth 3 to stop before the arms 4 begin to fold.

Figure 4:
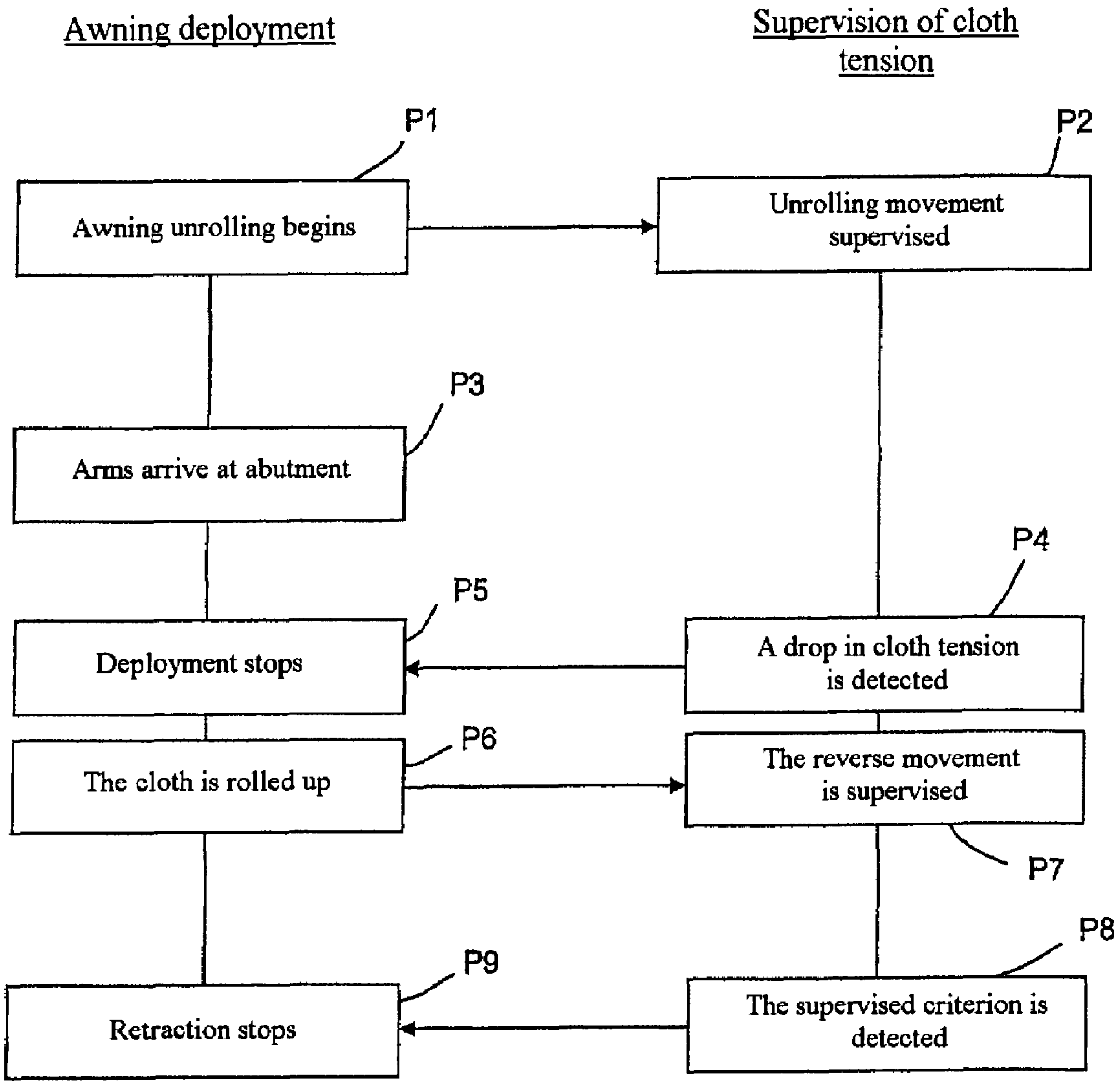
FIG. 4 is a flowchart of a control method of the installation of FIG. 1.

FIG. 4 reflects, in the form of a flowchart, the various steps linked to the deployment of the cloth and to the supervision of the tension of the cloth, and the links between these two aspects.

During a step P1, the unrolling of the cloth is started by an instruction from a user. The instruction is transmitted, for example, from a control point attached to the wall or from a mobile wireless remote control. This instruction causes the beginning of a step P2 for supervision of the torque measured by the sensor 7.

During step P2, the sensor 7 continuously measures a torque representative of the tension of the cloth 3 and this measured torque is compared in real time with the threshold $S_1$. A drop in the tension of the cloth is detected if the measured torque falls below the threshold $S_1$.

During a step P3, the arms 4 reach abutment. The arms lock. Shortly after the arms arrive at the abutment, the computer 8 detects a drop in tension of the cloth during a step P4.

For example, during the step P4, the computer 8 detects a drop in measured torque only if the latter is immediately preceded by an increase in the measured torque corresponding to the collision of the arms with an abutment. Accordingly, the computer 8 verifies that the detected drop in tension occurs in a predetermined period of time $\Delta t$ after the measured torque has exceeded a predetermined threshold. For example, the predetermined threshold is equal to the threshold $S_2$ indicated in FIG. 3*b*. The period $\Delta t$ here is chosen to be less than 1 second and preferably less than 0.5 second.

In response to the detection of a drop in the tension of the cloth, during a step P5, the computer 8 immediately commands the actuator to stop. Following this stoppage, the computer 8 automatically initiates, during a step P6, a rotation of the tube 21 in the reverse direction to that which has just taken place. This rolling movement instantaneously initiates a step P7 for supervising the stoppage of the rolling.

The step P7 consists, for example:

in verifying whether a predetermined time counted from the beginning of step P6 has elapsed, and/or in measuring the torque representative of the tension of the cloth 3 and in comparing this torque with the threshold $S_2$.

If, during a step P8, the computer 8 determines that the predetermined time has elapsed or that the measured torque has exceeded the threshold $S_2$, then it automatically commands, during a step P9, the rolling of the cloth 3 to stop. The cloth then remains immobilized in its deployed position until a new movement command is generated by the user.

The threshold $S_2$ is determined in a fixed manner, for example as a function of the surface area of the cloth, of the tension imposed on the elastic device 10 and/or on the type of abutments of the arms 4.

Figure 5:
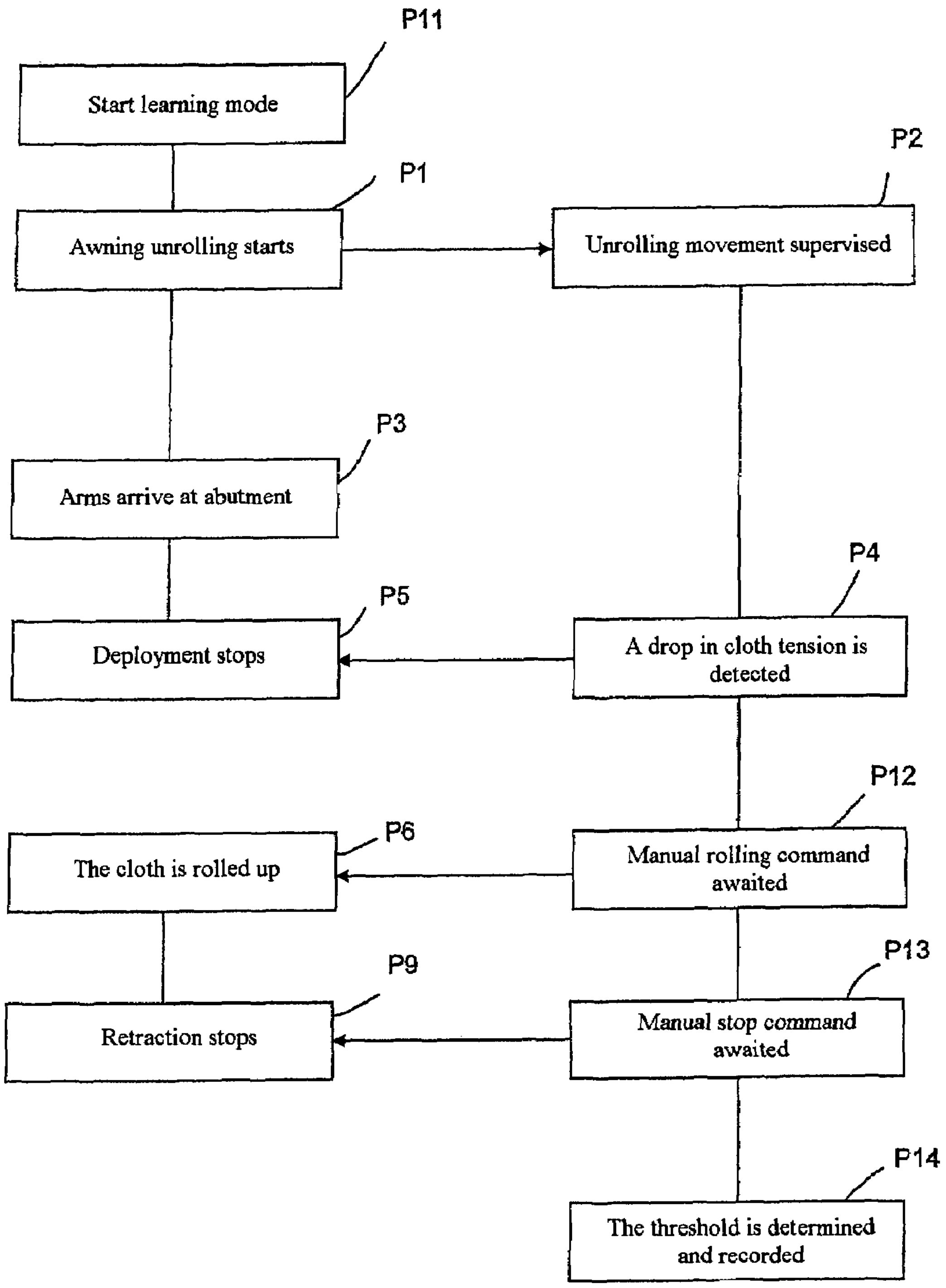
FIG. 5 is a method for adjusting the installation of FIG. 1, and FIGS. 6*a* and 6*b* are a schematic illustration of abutment mechanisms capable of being implemented in the installation of FIG. 1.

The value of the threshold $S_2$, or likewise the predetermined rolling time of the cloth, may also be adjusted manually by applying the adjustment method of FIG. 5.

At the beginning of the method of FIG. 5, during a step P11, a user switches the computer 8 to a learning Mode.

Then, the steps P1 to P5 of the method of FIG. 4 are applied.

However, in the learning mode, the computer 8 does not automatically proceed to step P6. On the contrary, during a step P12, the computer 8 waits for a command to roll the cloth that is generated manually by the user. Then, in response to this roll command, the computer 8 initiates the step P6 and, in parallel, during a step P13, the computer again waits, but this time for a manual command to stop the rolling.

When the user ascertains that the arms are at the point of folding, he manually causes the transmission of this command to stop the rolling. In response, the step P9 is applied and, in parallel, during a step P14, the computer determines and records the value of the threshold $S_2$ or the value of elapsed time during the rolling movement. The value of the threshold $S_2$ is determined on the basis of the value measured by the sensor 7 at the moment when the step P9 was initiated.

The value of the threshold $S_2$ or the rolling time thus defined by learning may be automatically modified to take account of a reaction time of the user.

This learning is fully compatible with the mechanism 11, particularly adjustable by the user.

Figure 6A:
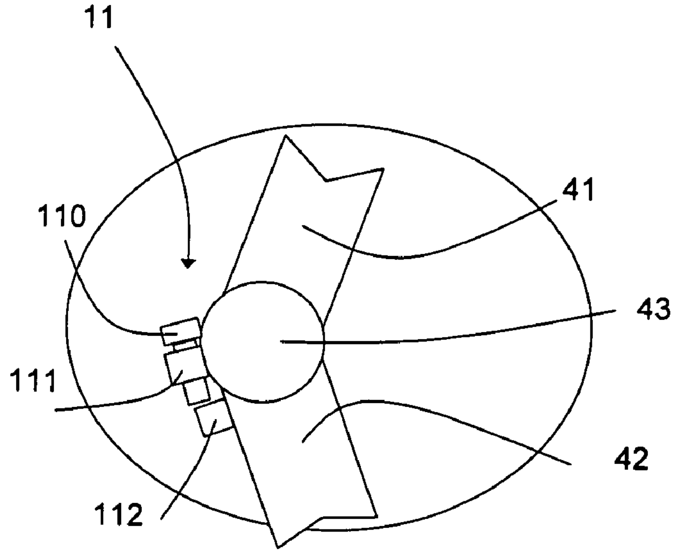

FIG. 6*a* shows an example of a mechanism 11 in the form of an adjustable abutment for an arm 4. This device adjustably limits the mechanical clearance of the arms.

In the embodiment of FIG. 6*a*, the mechanism 11 comprises an adjustment screw 110, screwed into a tapped lug 111. The lug 111 is attached, with no degree of freedom, to the first segment 41 of the arm 4 or to the hinge 43 of the arm 4. One end of the screw 110 butts against a lug 112 attached to the second segment 42 of the arm 4 when the arm 4 is in a fully unfolded position. Therefore, the screw 110 makes it possible to adjust the value $\alpha_{max}$ by screwing it more or less into the lug 111.

It is also possible to imagine an elastic abutment making it possible to cushion the impact between the end of the screw 110 and the lug 112, in order to protect the elements of the installation.

Figure 6B:
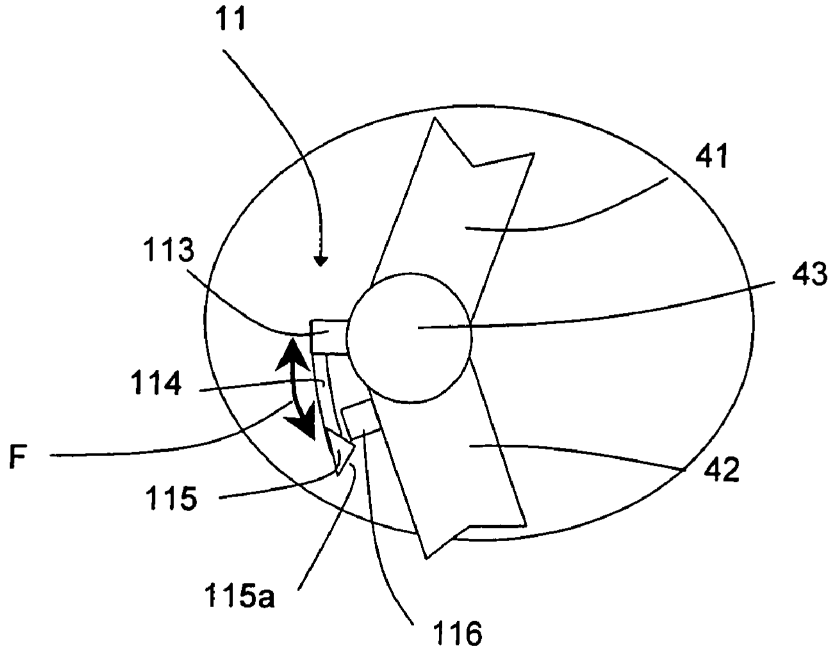

A second embodiment of the mechanism 11 is shown in FIG. 6*b*. It makes it possible, in addition to keeping the value of the angle $\alpha$ below 180°, to hold the arms in the fully deployed position. Accordingly, a first lug 113 attached, with no degree of freedom, to the hinge 43 of the arm 4 supports a flexible tab 114, at the end of which a protrusion 115 is mounted.

A second lug 116 is attached to the second segment 42 of the arm 4.

Preferably, the protrusion 115 and/or the lug 116 have surfaces that are inclined relative to a direction F of relative movement of the protrusion 115 relative to the lug 116. In FIG. 6*b*, only the protrusion 115 has a surface 115*a* that is inclined relative to the direction F.

The lugs 113 and 116, the tab 114 and the protrusion 115 form a retention mechanism suitable for keeping the angle $\alpha$ in the range ±X° around the value $\alpha_{max}$ so long as a tension force exerted on the arms to reduce this angle remains below a predefined tension threshold. For example, X is equal to or less than 5°.

Preferably, the protrusion 115 can be moved along the tab 114 in at least one direction contained in the plane of movement of the arms 4. This possibility of modifying the position of the protrusion 115 makes it possible to adjust the value X.

In addition, the flexibility of the tab itself may be adjusted. This makes it possible to define the value of a tension threshold beyond which the unlocking of the arms 4 becomes possible, as will be understood on reading the following.

During the deployment of the arms 4, the lug 116 encounters the inclined surface 115*a* of the protrusion 115. However, the deformation of the tab 114 allows the lug 116 to pass under the protrusion 115. The interaction of the lug 116 with the protrusion 115 forms a retractable abutment causing a drop in the tension of the cloth. After having passed this retractable abutment, the lugs 113 and 116 can come into abutment to mechanically limit the deployment of the cloth. An adjustment means as described with reference to FIG. 6*a* may also be used in this embodiment.

The arms 4 are then in a locking position, independent of the arm tension springs, capable of holding the cloth in its fully deployed position.

To unlock the arms 4, it is also necessary to provide a torque for unlocking the arms, this torque however being markedly less than that necessary for unlocking braced arms.

During the deployment of the cloth 3, the passing of the protrusion 115 causes a drop in the measured torque, which makes it possible to detect the proximity of the fully deployed position. In response, in this embodiment, the computer 8 automatically stops, after a predetermined time, the rolling of the cloth 3. This time is here predetermined to allow enough time for the lug 116 to pass the protrusion 115 and the arms therefore to be in their locking position. It is not necessary for this time to be sufficiently long for the lug 116 to butt against the lug 113.

The torque curve as a function of the time is then similar to that shown in FIG. 3*b*.

During the rolling movement making it possible to tension the cloth 3, it is also easier to automatically stop the movement before the passing of this protrusion 115. Specifically, the passing of the protrusion 115 corresponds to a considerable increase in the measured torque. The threshold $S_2$ may then be easily determined by learning.

Other systems of abutment and/or of fixing the value $\alpha_{max}$ may of course be envisaged without departing from the context of the invention. This is the case for example of a ball abutment or a retention device with a magnet, as described for example in patent application EP 1273733.

The invention finds a particularly worthwhile application in the context of awnings called autonomous awnings, that is to say operating thanks to a power source that is not connected to an electricity system and is, where necessary, rechargeable (for example thanks to photovoltaic cells).

Specifically, it is particularly important in this case to limit consumption, and hence to limit the power necessary to supply the actuator during the actuation of the awning, while keeping a sufficiently tensioned cloth.

The various functionalities usually associated with awnings are fully applicable in combination with what has just been described. For example, the docking abutment with reduced supply voltage or reduced speed, the destressing of the cloth, the joint use of sensors (of daylight, of wind, etc.) may be used in the above embodiments.

Other advantages linked to the invention are detailed below:

- a position meter is not necessary, the awning may move between its extreme positions (on one side the case and on the other the abutment, retractable or not, on the arms). This structure then simplifies the actuator that can be more easily sealed (specifically, the metering devices are entry points for damp, which represents a manufacturing constraint to the extent that such an awning is placed outdoors),
- the abutments may also be used for resetting the position in the case of using a manual maneuver in a system with no supply and with electronic metering.

Another advantage is associated with the detection of an obstacle when the awning descends. The detected change in tension of the cloth could also be due to the presence of an obstacle in the zone of deployment of the awning (for example the presence of a truck in front of a cafe terrace awning). In this case, the deployment of the awning is stopped according to the invention.

As a variant, the computer 8 and/or the sensor 7 are mounted outside the actuator.

In other embodiments, each arm 4 may unfold in its own plane of movement parallel to the plane of movement of the other arm.

Here, the awning installation has been described in the particular case in which the rolling step P6 is stopped automatically according to a predetermined time or the passing of the threshold $S_2$. As a variant, the step P6 of rolling the cloth is automatically stopped according to a predetermined angular distance. For example, the actuator 6 is automatically stopped as soon as the tube 21 has traveled this predetermined angular distance.

The invention claimed is:

1. A method for controlling a motorized awning installation to create a desired tension on a material of the awning, the installation including an awning cloth material connected to arms that unfold and fold relative to a deployed position for guidance of the cloth during deployment and retraction of the cloth, the cloth being rolled relative to a winding tube during deployment and retraction of the cloth when the winding tube is set in motion by an actuator, wherein the method comprises:

deploying the cloth in a first direction from the winding tube while monitoring a magnitude representative of the tension of the cloth;

stopping the winding tube when a magnitude representative of the tension of the cloth reflects the arms are unfolded to their deployed position;

automatically offsetting sagging of the cloth by actuating the actuator to wind the winding tube in a second direction which is reverse to the first direction so as to roll the cloth on the winding tube to thereby increase the tension of the deployed cloth in response to a drop in the monitored magnitude of tension of the cloth following stoppage of the winding tube, and thereafter stopping the rolling of the cloth onto the winding tube automatically before a perceptible folding of the arms occurs.

2. The method as claimed in claim 1, wherein the step of monitoring includes measuring a torque exerted by the actuator on the rolling tube during deployment of the cloth.

3. The method as claimed in claim 2, wherein:

the step of monitoring consists in detecting a drop in the measured torque following a stoppage of the associated movement of the arms during deployment, and the step of rolling the cloth on the tube is initiated automatically following the detection of this drop in the measured torque.

4. The method as claimed in claim 1, wherein the step of rolling the cloth onto the winding tube is automatically stopped as soon as the magnitude representative of the tension of the cloth becomes equal to or greater than a predetermined threshold tension.

5. The method as claimed in claim 1, wherein the step of rolling the cloth onto the winding tube is automatically stopped as soon as a predetermined time has elapsed since the initiation of the rolling step.

6. The method as claimed in claim 4, wherein the threshold tension is predetermined during a learning phase so as not to cause any perceptible folding of the arms.

7. The method as claimed in claim 5, wherein the time is predetermined during a learning phase so as not to cause any perceptible folding of the arms.

8. The method as claimed in claim 1, wherein the step of rolling is automatically stopped as soon as a change in the monitored magnitude of force representative of the tension of the cloth exceeds a predetermined threshold.

9. A motorized awning installation, which comprises:

an awning cloth, a controllable actuator for causing the awning cloth to be rolled on and relative to a rolling tube, folding arms guiding the cloth and being extended or folded accompanying the movement of the awning cloth in deployment and retraction, respectively, a sensor for measuring a magnitude representative of the tension of the cloth during and after its deployment, and a computer for receiving input from the sensor for controlling the actuator so as to automatically offset sapping of the deployed awning cloth, the computer being programmed to actuate the actuator to increase tension on the awning cloth by rolling of the awning cloth on the rolling tube in a direction reverse to a deploying direction thereof when the measured magnitude representative of the tension falls below a predetermined value upon deployment of the cloth and the computer thereafter stopping rolling to prevent folding of the arms.

10. The installation as claimed in claim 9, wherein each arm includes at least two segments pivoting relative to one another in a plane of movement of the arms, an angle $\alpha$ defined by the two segments in the plane of movement increasing as the cloth is deployed, an abutment mechanism for stopping the arms during an unfolding thereof when the value of the angle $\alpha$ reaches a given value of stopping angle of less than 180°.

11. The installation as claimed in claim 10, including a retention mechanism allowing the angle $\alpha$ to be maintained in a range ±X° about the stopping angle so long as a tension force exerted on the arms to reduce this angle remains below a predefined tension threshold, X° being less than 5°.

12. The installation as claimed in claim 11, wherein the abutment mechanism or retention mechanism is adjustable so as to regulate a value of the stopping angle, the predetermined value of the tension or the value of X.

13. The installation as claimed in claim 10, wherein the stopping angle is less than 150°.

* * * * *